Oct. 8, 1963 G. A. LYNN 3,106,678
ELECTRONIC MOTION DETECTOR FOR SIMULTANEOUSLY DETECTING
AND MEASURING POSITION, VELOCITY, AND
ACCELERATION IN THREE DIMENSIONS
Filed April 12, 1960
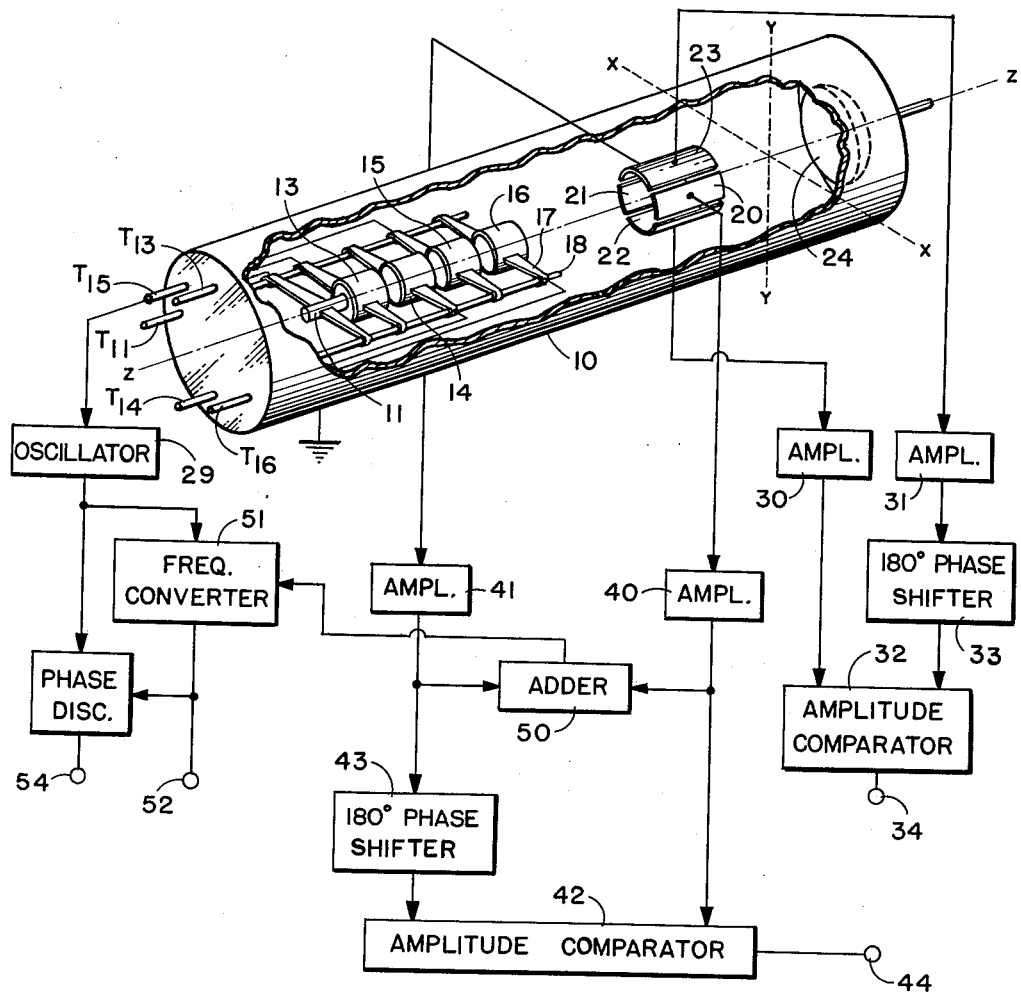
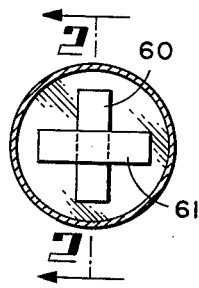
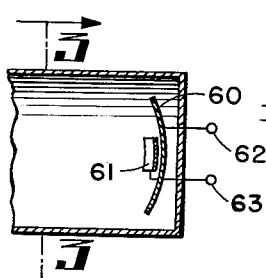
Fig 1
Fig 3  Fig 2
INVENTOR.
GEORGE A. LYNN.
BY
ATTORNEYS.

United States Patent Office 3,106,678
Patented Oct. 8, 1963

3,106,678
ELECTRONIC MOTION DETECTOR FOR SIMULTANEOUSLY DETECTING AND MEASURING POSITION, VELOCITY, AND ACCELERATION IN THREE DIMENSIONS
George A. Lynn, Cincinnati, Ohio, assignor to Avco Corporation, Cincinnati, Ohio, a corporation of Delaware
Filed Apr. 12, 1960, Ser. No. 21,671
6 Claims. (Cl. 324—70)

This invention relates generally to a device for electronically detecting motion and, more particularly, to a device for detecting and measuring position, velocity, and acceleration of a body simultaneously in three dimensions.

Briefly described, this invention contemplates the use of a motion detector in which relatively heavy, sloweddown, bunched ions are launched along the longitudinal axis of an ionization chamber, the chamber being provided with quadrature electrostatic vanes from which are derived voltages which are a function of ion position. When the ionization chamber is mounted on a body moving in a plane perpendicular to the longitudinal axis, the speed and acceleration of the body will change the ion beam path with respect to the quadrature electrostatic vanes, thereby changing the output voltages from the vanes to provide an indication of the new beam path. When the body is changing speed in a direction parallel to the longitudinal axis, the instantaneous velocity of the ions provides an indication of body velocity. The technique of using heavy, bunched ions which are permitted to move at a relatively slow speed results in a detector which is capable of producing accurate and usable motion indication simultaneously in three dimensions.

The techniques of remote and self-controlled guidance, such as that used in modern missiles, require extremely sensitive and accurate motion detectors which are miniaturized in weight and volume. In the past, use has been made of gyroscopes in various forms to provide a fixed reference so that departure data may be derived therefrom. Gyroscopes are adequate as rate-of-change sensors but the mechanical limits imposed on the gyroscope are reflected in limited accuracy and reliability of the associated sensing and control system. Other mechanical devices have similar limitations.

An electronic-type motion detector avoids many of the disadvantages of the mechanical detectors but, in the past, electronic motion detectors have been unsuccessful because the information derived therefrom is of such low order that it is difficult to interpret and use for driving control systems.

It is, therefore, the primary object of my invention to provide an electronic detector capable of sensing motion and of yielding precise and readily usable information.

Another object of my invention is to provide a relatively mass-free electronic device for simultaneously sensing motion along three mutually perpendicular axes.

Another object of my invention is to provide a relatively mass-free device capable of sensing acceleration and/or velocity.

Still another object of my invention is to provide a motion detector in which the sensing mass comprises slow-moving groups of ions, acceleration and velocity being determined by the position or by the velocity of the groups of ions.

For further objects and for a more complete understanding of the precise nature of this invention, reference should now be made to the following detailed description and to the accompanying drawings, in which:

FIG. 1 represents a preferred embodiment of my invention; and

FIGS. 2 and 3 illustrate a useful modification of my invention.

The motion detector illustrated in FIG. 1 is assumed to be mounted on a vehicle or other body, such as a missile or aircraft, and is intended for use in detecting motion along three mutually perpendicular axes $x$, $y$, and $z$. It comprises a tube having a longitudinal axis which, for convenience of discussion, is assumed to be the $z$ axis. The tube is constructed of a gas-filled metal container 10 in which are mounted a cathode 11, a focusing electrode 13, an accelerating electrode 14, a bunching electrode 15, and a decelerating electrode 16, all of which are aligned on the longitudinal axis of the tube and supported from conducting crosspieces 17 and rods 18 composed of a suitable insulator. Appropriate voltages are applied to each of the electrodes through terminal pins $T_{11}$–$T_{16}$, the subscript designating the element to which each pin is connected. In addition, there are also four position-detecting electrostatic sensor plates or vanes 20 and 21, and 22 and 23 disposed in quadrature for measuring motion along the $x$ and $y$ axes in a plane perpendicular to the longitudinal axis $z$. The vanes 20–23 are illustrated in the form of a split cylinder which is preferred, but it will be recognized that orthogonally disposed plates may also be used. Ion collector plate 24 is mounted at the end of the container 10 opposite the electron source. The container 10 is filled with any suitable ionizible gas, such as mercury, xenon, krypton, carbon dioxide, or argon.

In operation, when a negative voltage is applied to the cathode 11, electrons which are emitted collide with the gas in the region of the focusing electrode 13, thereby generating positive ions aimed by the focusing electrode 13 toward the accelerating electrode 14. The accelerating electrode is connected to a low negative voltage and, therefore, the positive ions which are produced at the focusing electrods 13 are accelerated through the electrode 14 toward the bunching electrode 15. The bunching electrode is energized by means of an oscillator 29 with an alternating voltage which may be in the form of a sine wave, a square wave, or such other alternating voltage as will cause the ions to accumulate into closely bunched groups. As the bunched groups of positive ions travel from the bunching electrode they are then decelerated to a relatively slow speed (approximately 5 to 10 cm./sec.) by means of the decelerating electrode 16 to which a low positive voltage is applied. The slow-moving, bunched ions then travel past the electrostatic vanes 20, 21, 22, and 23 and are collected by the anode 24 to which a low negative voltage is applied.

As the ions move past the electrostatic vanes 20, 21, 22, and 23, a voltage is induced into the vanes which is a function of the distance of the ions from the vanes. Since the vanes are positioned in quadrature, the voltage induced in all the vanes will be equal if the ions travel along the longitudinal axis of the container 10. On the other hand, if the path of the ions departs from the longitudinal axis of the container 10, then unequal voltages will be induced in the respective vanes, depending on the direction of the departure.

It is noted that each ion bunch passing the vanes will induce a single pulse and, hence, the stream of ion bunches will produce a pulsating direct current having a pulse repetition rate dependent on the frequency of the bunching current from the oscillator 29, and on the accelerating forces in the ions along the longitudinal axis.

As will now be demonstrated, the described device is capable of detecting and measuring acceleration and velocity along the three mutually perpendicular axes $x$, $y$, and $z$. Assuming the container 10 to be mounted on a vehicle which is at rest, and assuming the proper focusing of the electrons generated by the cathode 11, the ions which are created by the collision of the electrons with the gas will travel along the axis of the container at a uniform velocity dependent on the values of the voltages on the various electrodes. Now if, for example, the vehicle is accelerated in a direction parallel to the $x$ axis, the path of travel of the bunched ions will be displaced from the $x$ axis in a direction opposite to the direction of motion of the vehicle and, therefore, more voltage will be induced in one of the vanes 20 or 21 than in the other. Similarly, if the vehicle is accelerated in a direction parallel to the $y$ axis, then the ion displacement which results will produce unequal voltages in the vanes 22 and 23. Further, if the vehicle accelerates in a direction along the $z$ axis, there will be a change in ion speed and, hence, in the instantaneous pulse repetition rate of the direct voltages induced into the various vanes. By processing the voltages derived from the vanes 20, 21, 22, and 23 in a manner as will now be described, accurate data as to velocity and acceleration may easily be derived.

For determining velocity and acceleration along the $y$ axis, I apply the voltages induced in the vanes 22 and 23 to amplifiers 30 and 31, respectively. The outputs from amplifiers 30 and 31 are then compared in an amplitude-comparator 32, the output from amplifier 31 having previously been shifted in phase by 180 degrees by means of a phase-shifting network 33. The amplitude of the voltage output of amplitude-comparator 32 will be a direct function of the actual velocity of the vehicle. That is to say, with the vehicle moving along the $y$ axis, the distance of the ions from the respective vanes 22 and 23 will be a function of the time of travel of the ions from the decelerating electrode 16 to the vanes (a constant with fixed voltages applied to the electrodes and with no acceleration along the $z$ axis of the container 10) and a function of velocity of the vehicle. Therefore, with a constant velocity the output of the amplitude-comparator at terminal 34 will be a steady-state direct current having a positive or a negative polarity, depending on the direction of the velocity. If the vehicle is accelerating, then the output will be a direct current which is varying as the velocity changes, and acceleration may be determined by simple differentiation.

Similarly, if the motion of the vehicle is along the $x$ axis, unequal voltages will be produced at the vanes 20, 21, and these voltages are applied to amplifiers 40, 41, respectively. The amplified voltages are then compared in an amplitude-comparator 42, the amplitude from the amplifier 41 having first been phase-inverted by means of a phase shifter 43. Thus, the output at terminal 44 is a direct function of the velocity of the vehicle along a second axis, and the rate of change of the voltage appearing at the terminal 44 is a direct function of acceleration.

The pulse repetition rate of the voltage induced in the vanes is dependent on the frequency of oscillator 29, but, as was previously noted, a change of velocity along the longitudinal axis of the container 10 will produce a variation in the rate. Obviously, this variation occurs only during periods of acceleration or deceleration and, hence, is a function of acceleration rather than of velocity. In order to determine the rate of change of velocity of the bunched ions, the outputs from amplifiers 40, 41 are combined in an adder 50 and the combined outputs are then mixed in a frequency converter 51 with the output of the oscillator 29. As is well known, the output of frequency converter 51 will contain both input frequencies and the sum and difference frequencies. Preferably, the difference frequency is derived from the frequency converter 51 by appropriately tuned circuitry and appears at the terminal 52. This difference frequency is a direct function of the rate of change of velocity of the bunched ions past the vanes 20, 21 and, thus, is a function of the acceleration of the vehicle along the $z$ axis. In order to determine the direction of acceleration, the output of the frequency converter 51 and the oscillator 29 may be applied to a phase discriminator 53, thereby yielding a direct voltage at terminal 54 having a polarity which is a function of the direction of acceleration. To determine velocity it is necessary only to apply the voltages appearing at the terminal 52 to an appropriate integrating network and memory.

It is noted that the range of operation of this motion detector may be extended by adjusting the voltages applied to the various electrodes. For example, by reducing the positive potential on the decelerating electrode 16 or by increasing the negative potential on the anode 24, the bunched ions will travel at a higher velocity and will not be materially affected by small accelerating forces or velocities. On the other hand, increasing the positive potential on the decelerating electrode 16 or decreasing the negative potential on the anode 24 will cause the ions to move at a very slow rate of speed, thereby making the device extremely sensitive to very small accelerating forces or velocities. Therefore, depending on the intended purpose of the device, the sensitivity may be varied effectively over a wide range.

A modification of my invention is illustrated in FIGS. 2 and 3, wherein is shown a split collector plate which may be substituted for the collector plate 24 of FIG. 1. The split collector plate illustrated comprises two anodes 60 and 61 positioned at right angles with respect to one another and transverse to the longitudinal axis of the tube. If it is assumed that the normal forward motion of the vehicle is along the $x$ or $y$ axis then, on the occurrence of roll of the vehicle, the ion beam will alternately impinge on the vanes 60 and 61, thereby producing pulsed outputs alternately at the terminals 62 and 63. As will be recognized by those skilled in the art, the voltages derived from the terminals 62 and 63 may be used for applying corrective measures to the vehicle or for telemetering the information concerning the position of the vehicle to a remote station.

The physical shape of a detector built in accordance with this invention will require a cylindrical container no more than ⅜ inch in diameter and 1¼ inches long, thus permitting its use in applications where miniaturization is a requirement.

While I have shown only two preferred embodiments of my invention, many modifications and adaptations will become immediately apparent. For example, the vanes 20–23 may be in the form of plates mounted in quadrature, or the container 10 may be made of glass coated internally with a metal. In addition, the computing techniques are merely illustrative of a single solution, and many other known techniques are available and adaptable to this invention. For this reason it is my intention that the invention be limited only by the following claims as interpreted in the light of the prior art.

What is claimed is:

1. A detector for sensing the motion of a body, said detector being mounted on said body, the combination comprising: a sealed container partially filled with an ionizible gas; a cathode mounted in said container; means for emitting electrons from said cathode whereby positive ions are produced in said container; an accelerating electrode mounted in said container for accelerating said positive ions along a predetermined axis; a bunching electrode energized with an alternating current having a predetermined frequency for bunching said positive ions into a relatively heavy mass; a decelerating electrode for retarding the velocity of said bunched ions to a predetermined velocity; first and second opposed pairs of electrostatic vanes in quadrature positioned along said axis, said axis passing between said vanes at equal distances therefrom when said body is at rest in the plane perpendicular to said axis, said bunched positive ions inducing series of voltage pulses in each of said vanes; and means for comparing the amplitude of the voltages induced in each of said vanes for sensing motion of said body in said plane.

2. The invention as defined in claim 1, and means for comparing said predetermined frequency with the pulse repetition rate of said induced voltages for determining a change in motion along said axis.

3. A detector for sensing motion of a body, said detector being mounted on said body and comprising: means for launching positive ions along a given axis; bunching means for bunching groups of said ions, said bunching means comprising an electrode mounted along the path of travel of said ions, said electrode being energized with an alternating current having a predetermined frequency; means for decelerating said bunched ions to a relatively slow reference velocity; displacement detecting means for detecting the displacement of said ions from said axis due to motion of said body in a plane perpendicular to said axis, said bunched ions inducing a pulsating direct voltage in said displacement detecting means at a pulse repetition rate corresponding to said frequency when the velocity of said body along said axis is constant; and means for detecting a change in velocity of said ions along said axis due to a change in velocity of said body along said axis, said last means comprising means for comparing said pulse repetition rate with said predetermined frequency.

4. The invention as defined in claim 3 wherein said displacement detecting means for detecting the displacement of said ions comprises first and second pairs of electrostatic vanes mounted along said axis, said first vanes being mounted in quadrature with said second vanes.

5. A detector for sensing motion of a body, said detector being mounted on said body and comprising: an elongated container partially filled with an ionizible gas; a source of electrons; means for releasing said electrons into said container for producing positive ions; means for accelerating said positive ions along the longitudinal axis of said container; bunching means for bunching pluralities of said positive ions, said bunching means comprising an electrode mounted along the path of travel of said ions, said electrode being energized with an alternating current having a predetermined frequency; means for decelerating said bunched positive ions; displacement detecting means for determining the displacement of said bunched positive ions from said longitudinal axis due to motion of said body in a plane perpendicular to said axis, said bunched ions inducing a pulsating direct voltage in said displacement detecting means at a pulse repetition rate corresponding to said frequency when the velocity of said body along said axis is constant; and means for determining the instantaneous velocity of said positive ions along said longitudinal axis, said last-named means comprising means for comparing said pulse repetition rate with said predetermined frequency.

6. The invention as defined in claim 5, wherein said displacement detecting means for detecting the displacement of said ions comprises first and second pairs of electrostatic vanes mounted along said axis, said first vanes being mounted in quadrature with said second vanes.

References Cited in the file of this patent

UNITED STATES PATENTS

| | | |
|---|---|---|
| 2,295,315 | Wolff | Sept. 8, 1942 |
| 2,457,620 | Abraham | Dec. 28, 1948 |
| 2,542,797 | Cuccia | Feb. 20, 1951 |
| 2,565,357 | Donal | Aug. 21, 1951 |
| 2,772,364 | Washburn | Nov. 27, 1956 |
| 2,837,675 | Iversen | June 3, 1958 |
| 2,943,219 | Bryan | June 28, 1960 |
| 2,944,419 | Paalu | July 12, 1960 |